Dec. 9, 1969　　　　　　　H. EPISCOPO　　　　　　3,482,549
BIRD FEEDING FIXTURE
Filed Feb. 20, 1968　　　　　　　　　　　　　2 Sheets-Sheet 1
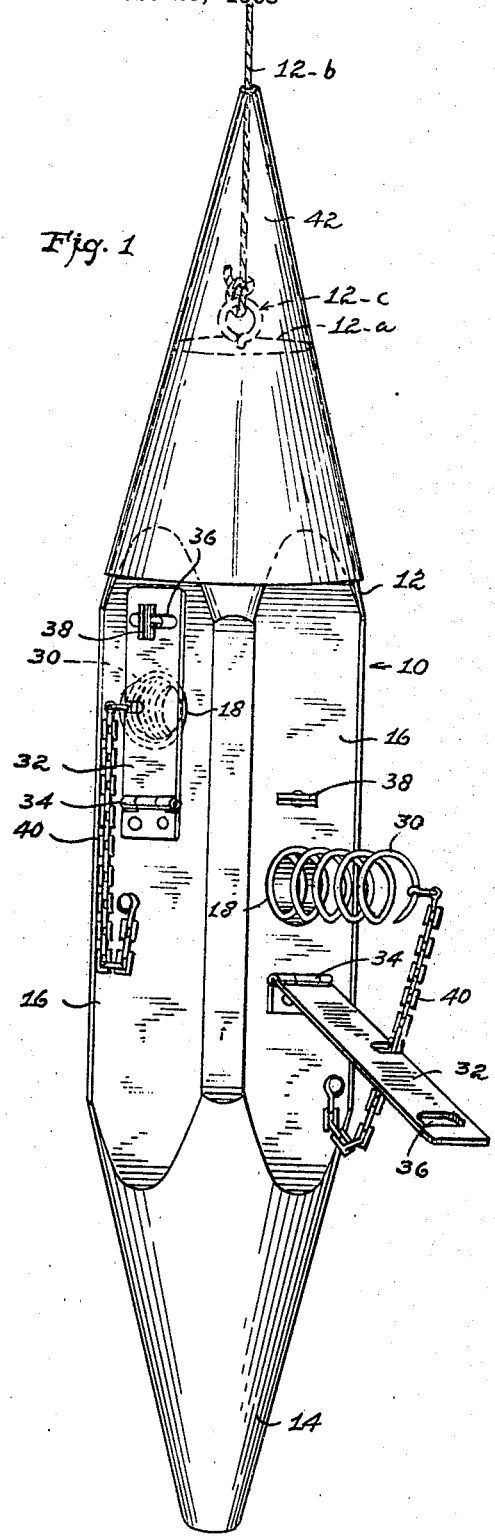
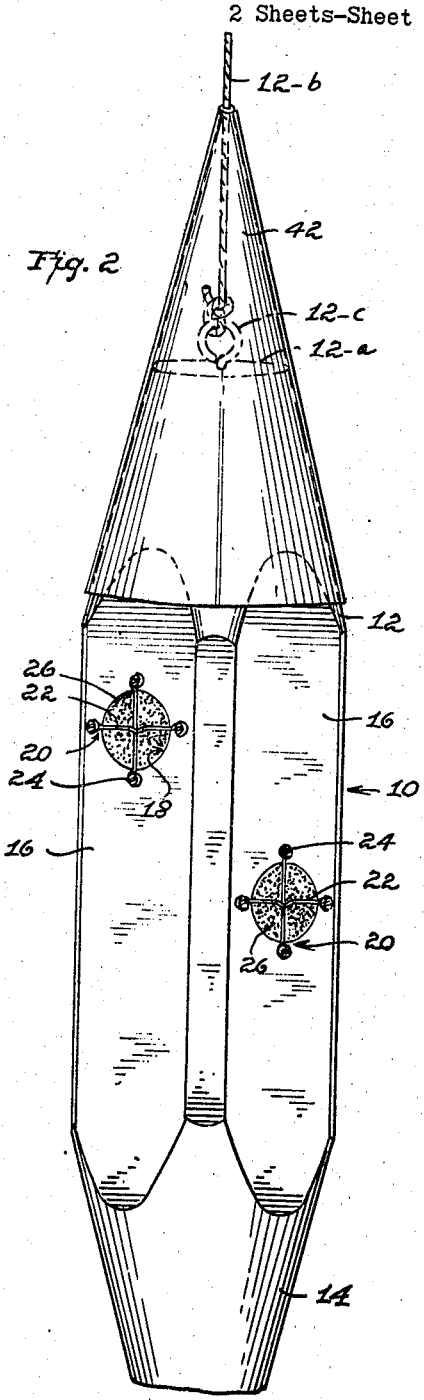
Harry Episcopo
INVENTOR
BY J. W. Mills
ATTORNEY Dec. 9, 1969    H. EPISCOPO    3,482,549
BIRD FEEDING FIXTURE
Filed Feb. 20, 1968    2 Sheets-Sheet 2
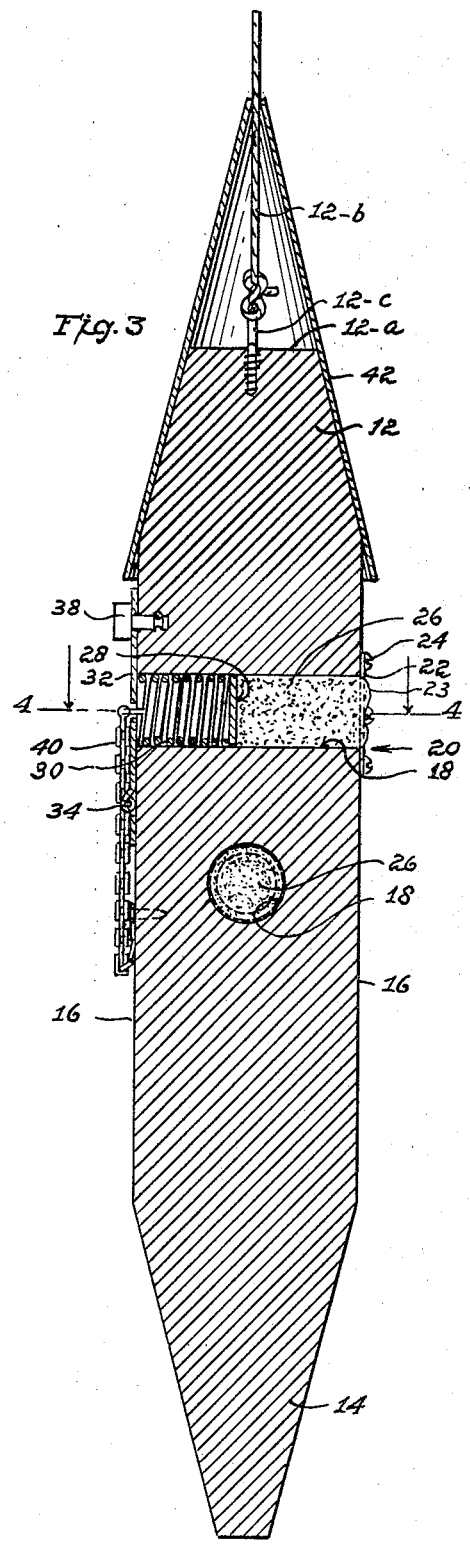
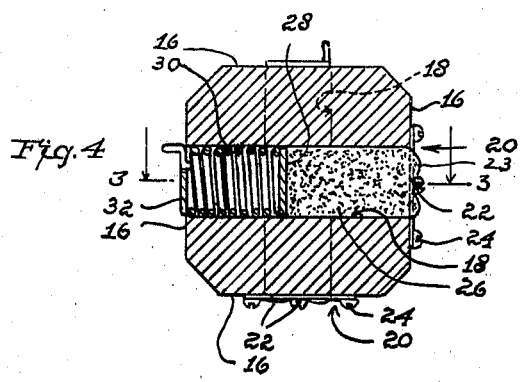
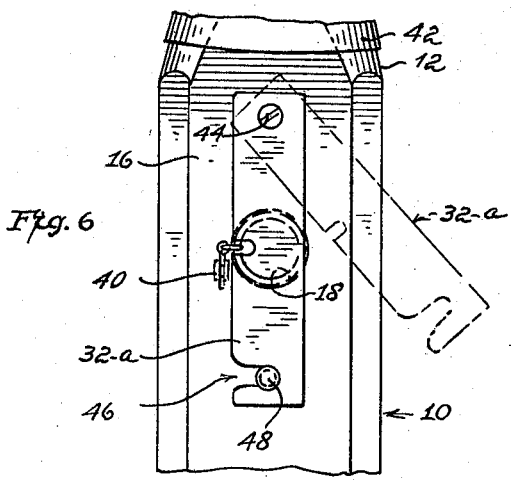
Harry Episcopo
INVENTOR
BY J. N. Miller
ATTORNEY United States Patent Office 3,482,549
Patented Dec. 9, 1969

3,482,549
BIRD FEEDING FIXTURE
Harry Episcopo, 74 Wilburtha Road,
Trenton, N.J. 08628
Filed Feb. 20, 1968, Ser. No. 706,892
Int. Cl. A01k 5/00
U.S. Cl. 119—51       6 Claims

ABSTRACT OF THE DISCLOSURE

An elongated body member of rectangular cross-sectional shape made of non-metal material for suspension and having a plurality of horizontal through bores in vertically spaced and right angular relation, each open at one end for insertion of suet, a wide meshed screen across its other end and a compression spring urged disc back of the charge of suet for forcing it toward the screen as it is pecked away through the meshes of the screen.

---

This invention relates to wild bird fixtures of the general type constructed from a block of wood suspended from a tree branch or a post and having through horizontal bores into which suet or the like is stuffed to be pecked away by birds at the ends of the bores.

One of the principal objects of the present invention is to provide a bird feeding fixture of the character mentioned designed particularly for the feeding of woodpeckers, finches and birds of similar habits which normally obtain insects and other food from the bark or holes in trees by clinging to the surface by their feet, as distinct from sparrows and other kinds of birds which can take seeds and the like from the ground or a floor.

Previous bird feeding fixtures of the type mentioned have been impractical for the feeding of woodpeckers and the like in that marauding starlings, blackbirds and other long-billed birds consume all the suet in the holes at one feeding, or drag it from the holes, thereby leaving them entirely empty before the birds for which the food is intended come to the fixture. Also, squirrels and other rodents gnaw into the holes and devour the food.

Therefore, a more specific object of the present invention is to provide a non-metal wild bird feeding fixture constructed in such a manner as to ensure positive protection to a food such as suet and the like intended for woodpeckers and birds of similar nature from marauding starlings, blackbirds and other long-billed birds, and also from squirrels or other rodents, so that one charge of food substance will last for several feedings of the birds for which it is intended.

In the carrying out of this invention I have observed that birds of the woodpecker class have stiff tail feathers which aid their claws in supporting themselves on smooth and flat wooden surfaces, whereas birds of other species mentioned will slip off such surfaces. Accordingly, I have constructed the bird feeding fixture of the present invention with an elongated body member of wood or other non-metal material having flat faces through which horizontal food containing bores extend. The portions of the fixture above and below the flat surfaces are made acutely conical to preclude any convenient foodhold thereon for a bird within reach of the food within the horizontal bores.

While the body of the fixture is made of wood or other non-metal material, I have provided a smooth close fitting cap of aluminum or other suitable metal for the upper conical portion of the fixture which effectively prevents squirrels and other rodents from climbing down the fixture from a tree or other support from which the fixture is suspended onto the flat surfaces in which the food containing bores are located.

One end of each of the bores is partially closed by a screen having wide meshes through which the suet or similar food is pecked. This screen may be of the crossed wire type or of solid disks or plate having therein openings of suitable size.

In practice, each of the horizontal bores may be filled with suet or the like throughout over half its length. The substance is automatically forced against the screen by means of a helical spring against a slidable disk back of the charge of food. A closure member attached to the fixture engages the outer end of the spring to hold is under compression so that it will automatically extend as the food is consumed through the meshes of the screen.

Suet is a waxy-like substance which cannot be forced entirely through the meshes of a screen in the manner of butter or lard, but will only bulge slightly outward through the meshes, which not only provides easy access to the food, but conserves it through several feedings.

Other objects and advantages of my improved bird feeding fixture will be apparent or pointed out in the following specification in which reference is directed to the accompanying drawings forming a part thereof and in which FIG. 1 is an elevation of a bird feeding fixture in accordance with the present invention looking toward one corner of the fixture;

FIG. 2 is a similar view of the fixture, looking toward the opposite corner;

FIG. 3 is a sectional view of the fixture taken on the line 3—3 of FIG. 4;

FIG. 4 is a sectional view of the fixture taken on the line 4—4 of FIG. 3;

FIG. 5 is a side view of the compression spring and disk as shown in FIGS. 3 and 4; and FIG. 6 is a detail view of the fixture with a modified form of spring compression member.

Referring to the drawings in which like numerals designate like parts in the several views, and referring first to FIGS. 1 to 5, in the form of the invention illustrated, the body member 10 may be made of wood or other suitable non-metal material. This body member is elongated and terminates at its ends in acutely tapered conical portions 12 and 14 merging into an intermediate portion of generally square cross-sectional shape and forming two pairs of opposed flat surfaces 16; each of these surfaces being connected by one or more through horizontal bores 18, each being partially closed at one end by a wide mesh screen 20 which may consist of a pair of wires 22 attached at their ends to the fixture 10 by means of screws 24, or other suitable means, in crossed relation in front of the bores 18, or the screen may consist of a disk or plate having openings therethrough of suitable size instead of wire meshes. The other ends of the bores are open for the insertion of a charge of suet 26 or other similar food substance.

A disk 28 is inserted in each of the bores 18 back of the charge of suet, and a helical spring 30 is also inserted in each bore back of the disk, which may be fixedly attached to the inner end of the spring, the ends of which are preferably at right angles to its axis. A spring compression member may consist of an elongated plate 32 attached at one end below each bore 18 by a hinge 34 or other suitable means. A slot 36 is formed in the free end of the plate 32 to be engaged by a rotary thumb latch 38, or other suitable means, on the fixture above each bore for fastening the plate in abutting relation with the outer end of the spring 30 to hold it in compressed condition with the disk 28 forcing the suet against the openings in the screen 20.

The spring 30 is of sufficient length so that after it is compressed and secured by the plate 32 it will automatically continue forcing the suet into the meshes or openings in the screen 20, as it is pecked away through the openings therein. As previously mentioned, suet being a waxy-like substance, when forced against the screen 20 by the disk 28 and spring 30 will only bulge outwardly in the openings of the screen, as indicated at 23 (FIGS. 3 and 4) and not be forced entirely through the screen.

The spring 30 may be prevented from being lost, or springing into the face of a person when it is released, by means of a small chain 40, a wire or a weatherproof cord attached at one end to the fixture 10 and at the other end to the outer end of the spring.

As previously mentioned, a conical cap 42, made of aluminum or other suitable metal may be closely fitted over the upper conical portion 12 to prevent squirrels or other rodents from climbing down into access to the bird food in the horizontal bores of the fixture 10.

The spring compressing plate 32–a shown in FIG. 6 is pivotally mounted on the fixture 10 as shown at 44 and has a slot 46 in one edge for engagement with a headed screw 48 on the fixture, or by other suitable means.

The upper conical portion 12 may be truncated as indicated at 12–a and the fixture 10 suspended from a tree branch or other support (not shown) by means of a wire or cord 12–b, or by a small chain attached to a screw-eye 12–c inserted in the center of the truncated portion 12–a.

My improved bird feeding fixture is not only effective in conserving food intended for woodpeckers and similar birds but it is also attractive in appearance and economical in construction. As shown in FIGS. 1, 2, 3 and 4, two or more bores 18 may be formed in the flat surfaces in right-angular, vertically spaced relation.

Obviously various changes or modifications may be made in my improved bird feeding fixture without departing from the spirit or scope of my invention. Therefore, it should be understood that the embodiments of my invention shown and described are intended to be illustrative only.

I claim:

1. A bird feeding fixture comprising, in combination, an elongated, non-metal body member terminating at its ends in acutely tapered conical portions merging into an intermediate portion of generally square cross-sectional shape and forming two pairs of opposed flat surfaces, each of said surfaces being connected by, at least, one through horizontal bore partially closed at one end by a wide mesh screen and open at its other end for the insertion therein of a charge of suet, a disk in said bore back of said suet, a helical spring in said bore back of said disk, a spring compressing member mounted on said fixture in abutting relation with the outer end of said spring for holding said spring in a compressed condition to force said suet into the openings of said screen; and means attached to said fixture for suspending it from a support.

2. A bird feeding fixture as in claim 1 and including a close fitting metal cap mounted on the upper conical portion thereof.

3. A bird feeding fixture as in claim 1 and including an elongated flexible element attached at one end to said fixture and at its other end to the outer end of said spring for anchoring said spring to said fixture.

4. A bird feeding fixture as in claim 1 in which the wide mesh screen consists of a pair of wires attached at their ends to said fixture in crossed relation in front of said bore.

5. A bird feeding fixture as in claim 1 in which the spring compressing member consists of a flat elongated plate hingedly attached to said fixture below a through bore and means on said fixture above said bore engageable with a slot in the free end of the plate for fastening it to said fixture across the outer end of said spring.

6. A bird feeding fixture as in claim 1 in which the spring compressing member consists of a flat elongated plate pivotally attached to said fixture below a through bore, and means on said fixture above said bore engageable with a slot in the free end of the plate for fastening it to said fixture across the outer end of said spring.

References Cited

UNITED STATES PATENTS

| | | | |
|---|---|---|---|
| 1,119,413 | 12/1914 | Dreibelbis | 119—60 |
| 2,306,312 | 12/1942 | Hyde | 119—51 |
| 3,273,537 | 9/1966 | Orr | 119—51 |

HUGH R. CHAMBLEE, Primary Examiner